(12) United States Patent
Matsumoto et al.

(10) Patent No.: US 9,242,378 B2
(45) Date of Patent: Jan. 26, 2016

(54) SYSTEM AND METHOD FOR DETERMING NECESSITY OF MAP DATA RECREATION IN ROBOT OPERATION

(75) Inventors: Kosei Matsumoto, Yokohama (JP); Toshio Moriya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 764 days.

(21) Appl. No.: 13/375,669

(22) PCT Filed: May 27, 2010

(86) PCT No.: PCT/JP2010/059004
§ 371 (c)(1),
(2), (4) Date: Dec. 1, 2011

(87) PCT Pub. No.: WO2010/140533
PCT Pub. Date: Dec. 9, 2010

(65) Prior Publication Data
US 2012/0083923 A1 Apr. 5, 2012

(30) Foreign Application Priority Data
Jun. 1, 2009 (JP) .................................. 2009-132444

(51) Int. Cl.
G01C 21/00 (2006.01)
B25J 9/16 (2006.01)
G05D 1/02 (2006.01)

(52) U.S. Cl.
CPC ................ B25J 9/1664 (2013.01); G05D 1/024 (2013.01); G05D 1/0274 (2013.01);
(Continued)

(58) Field of Classification Search
CPC ...... G01C 21/22; G01C 21/206; G01C 21/32; G01C 21/30; G05D 1/024; G05D 1/0274; G05D 1/0257; G05D 1/0242; G05D 2201/0207; G01S 13/931; B25J 9/1664; G05B 2219/40516; G05B 2219/40506; G05B 2219/40424

USPC .......... 700/258, 245, 255; 701/23, 24, 25, 26, 701/409, 446, 450, 454, 532, 447, 448
See application file for complete search history.

(56) References Cited

U.S. PATENT DOCUMENTS 5,721,679 A * 2/1998 Monson .......................... 701/50
7,085,624 B2 * 8/2006 Aldred et al. ................. 700/253
(Continued)

FOREIGN PATENT DOCUMENTS

JP 63-213005 9/1988
JP 2003-345438 12/2003
(Continued)

OTHER PUBLICATIONS

Chinese Office Action 201080024211.9; 2013022000755350, issued on Feb. 25, 2013.
(Continued)

*Primary Examiner* — Thomas G Black
*Assistant Examiner* — Sze-Hon Kong
(74) *Attorney, Agent, or Firm* — Baker Botts L.L.P.

(57) ABSTRACT

The invention notifies a robot controller of the need to re-create map data. A robot control system (1) includes a robot (2) that moves along a path while detecting obstacles, and a robot control terminal (3) that records map data (321) and specifies the path of said robot (2), whereby said robot (2) uses lasers to make measurements while in motion and sends the results as sensor data (324) to said robot control terminal (3), which uses said sensor data to generate simulated sensor data (325) along the future path of said robot, and if the proportion of sections for which simulated sensor data and said map data (321) do not coincide exceeds a threshold value, the user is notified of a reconstruction of said map data (321).

10 Claims, 11 Drawing Sheets

(52) U.S. Cl.
CPC ........... *G05B 2219/40424* (2013.01); *G05B 2219/40506* (2013.01); *G05B 2219/40516* (2013.01); *G05D 2201/0207* (2013.01)

(56) References Cited

U.S. PATENT DOCUMENTS

| | | | |
|---|---|---|---|
| 7,507,948 B2* | 3/2009 | Park et al. ............... | 250/221 |
| 7,765,499 B2* | 7/2010 | De Graeve et al. ....... | 706/20 |
| 7,769,491 B2* | 8/2010 | Fukuchi et al. .......... | 700/253 |
| 7,865,267 B2* | 1/2011 | Sabe et al. ............... | 700/245 |
| 7,916,931 B2* | 3/2011 | Lee et al. ................. | 382/153 |
| 8,023,727 B2* | 9/2011 | Matsumoto et al. ...... | 382/154 |
| 8,060,254 B2* | 11/2011 | Myeong et al. .......... | 700/253 |
| 8,160,296 B2* | 4/2012 | O'Hara et al. ............ | 382/103 |
| 8,180,486 B2* | 5/2012 | Saito et al. ............... | 700/245 |
| 8,195,386 B2* | 6/2012 | Hu et al. .................. | 701/436 |
| 8,200,423 B2* | 6/2012 | Dietsch et al. ........... | 701/409 |
| 8,260,485 B1* | 9/2012 | Meuth et al. .............. | 701/26 |
| 8,306,738 B2* | 11/2012 | Kong et al. ............... | 701/411 |
| 8,478,522 B2* | 7/2013 | Ohira et al. .............. | 701/450 |
| 8,483,881 B2* | 7/2013 | Ermakov et al. ......... | 700/259 |
| 8,706,297 B2* | 4/2014 | Letsky ...................... | 700/245 |
| 2004/0167667 A1* | 8/2004 | Goncalves et al. ....... | 700/245 |
| 2005/0187678 A1* | 8/2005 | Myeong et al. .......... | 701/27 |
| 2005/0192707 A1* | 9/2005 | Park et al. ................. | 700/259 |
| 2005/0216126 A1* | 9/2005 | Koselka et al. ........... | 700/259 |
| 2006/0025888 A1* | 2/2006 | Gutmann ............ | G06T 7/0075 700/245 |
| 2006/0041333 A1* | 2/2006 | Anezaki .................. | 700/259 |
| 2006/0058921 A1* | 3/2006 | Okamoto ............ | G05D 1/0214 700/255 |
| 2006/0262188 A1* | 11/2006 | Elyada et al. ............. | 348/143 |
| 2007/0021908 A1* | 1/2007 | Jaugilas et al. ........... | 701/208 |
| 2007/0027579 A1* | 2/2007 | Suzuki ................ | G05D 1/0251 700/245 |
| 2007/0156286 A1* | 7/2007 | Yamauchi .................. | 700/245 |
| 2007/0271003 A1* | 11/2007 | Bang ................... | G05D 1/0274 700/245 |
| 2007/0293985 A1* | 12/2007 | Myeong et al. .......... | 700/245 |
| 2008/0009965 A1* | 1/2008 | Bruemmer et al. ....... | 700/245 |
| 2008/0027591 A1* | 1/2008 | Lenser ................ | G05D 1/0251 701/2 |
| 2008/0240513 A1* | 10/2008 | Xie et al. .................. | 382/113 |
| 2009/0024251 A1* | 1/2009 | Myeong et al. .......... | 700/259 |
| 2009/0093907 A1* | 4/2009 | Masaki et al. ............ | 700/248 |
| 2009/0105945 A1* | 4/2009 | Nonaka .................... | 701/208 |
| 2009/0149992 A1* | 6/2009 | Ohno ................. | B25J 9/1664 700/253 |
| 2009/0182464 A1* | 7/2009 | Myeong et al. .......... | 701/25 |
| 2009/0187336 A1* | 7/2009 | Kawamata et al. ....... | 701/200 |
| 2009/0306822 A1* | 12/2009 | Augenbraun et al. .... | 700/245 |
| 2009/0326713 A1* | 12/2009 | Moriya .................... | 700/255 |
| 2010/0070078 A1* | 3/2010 | Kong et al. ............... | 700/259 |
| 2010/0094460 A1* | 4/2010 | Choi et al. ................ | 700/251 |

FOREIGN PATENT DOCUMENTS

| | | |
|---|---|---|
| JP | 2005-326944 | 11/2005 |
| WO | WO 2007/028049 | 3/2007 |

OTHER PUBLICATIONS

Henrik Andreasson et al., Has Something Changed Here? Autonomous Difference Detection for Security Patrol Robots, Centre of Applied Autonomous Sensor Systems, Dept. Of Technology, Örebro University, Sweden. Henrik.andreasson@tech.oru.se.

* cited by examiner

SYSTEM AND METHOD FOR DETERMINING NECESSITY OF MAP DATA RECREATION IN ROBOT OPERATION

FIELD OF THE INVENTION

The present invention relates to a technique of a robot control system, a robot control terminal, and a robot control method.

BACKGROUND OF THE INVENTION

In order to efficiently move a robot in an environment, the robot needs to know a position and an orientation thereof. In estimating a position and an orientation of the robot, such a technique is typically used that a matching is performed between a preset map data representing a geometrical shape of an environment and a geometrically-shaped data obtained from a sensor of the robot. In the technique of estimating a position and an orientation, the preset map data is assumed to coincide with a real environment (an actual environment). Depending on an environment in which the robot is operated, however, an unmatched portion may be generated between the preset map data and the actual environment because a human, an other robot, or the like may move an object present in the environment. The discrepancy between the map data and the actual environment generated as described above may lead to a matching error between the map data of the robot and the sensor data, that is, an estimation error of a position and an orientation of the robot, which results in a failure of an autonomous movement of the robot. It is thus necessary to re-create the map data for the robot such that there is no discrepancy between the map data and the actual environment.

One of the effective ways to determine whether or not it is necessary to re-create the map data is that an unmatched portion generated between a map data and an actual environment is made visual by a robot or a control system thereof and is presented to an administrator of the robot.

A technique related to visualization of an unmatched portion between the map data and the actual environment is described in, for example, Non-Patent Document 1. The technique of Non-Patent Document 1 proposes that: the latest sensor data is compared to an older sensor data; a difference therebetween is detected on a map and is represented by a group of points in 3DCG (3-Dimension Computer Graphics); and a change in the map from the past data is presented to an administrator of the robot.

RELATED ART DOCUMENT

Non-Patent Document

Non-Patent Document 1: Henrik Andreasson, Martin Magnusson and Achim Lilienthal, "Has Something Changed Here? Autonomous Difference Detection for Security Patrol Robots", Proceedings of the 2007 IEEE/RSJ International Conference on Intelligent Robots and Systems, pp. 3429-3435, 2007.

SUMMARY OF THE INVENTION

Problem to be Solved by the Invention

The technique described in Non-Patent Document 1 presents an area in which there is a discrepancy between the past and current map data, to the administrator of the robot. However, there is a problem that the displayed presentation is not sufficient for the administrator of the robot to determine whether or not the discrepancy is so large that leads to a position estimation error of the robot, that is, whether or not it is necessary to re-create the map data.

In light of the background, the present invention has been made in an attempt to notify an administrator of a robot, of whether or not it is necessary to re-create a map data.

Means for Solving the Problem

To solve the problem as described above, the present invention provides a robot control system, including: a robot that moves on a path while detecting an obstacle by a distance measurement sensor; and a robot control terminal that stores a map data in a storage part and instructs the robot on which path the robot is to move. The robot moving on a path transmits a first measurement result obtained by the distance measurement sensor to the robot control terminal. The robot control terminal: estimates a second measurement result which is to be measured in a future time at a location at which the robot arrives after the robot moves, in such a manner that the second estimated measurement result can be compared to the map date, based on the first measurement result transmitted from the robot; and notifies a user of a re-creation of the map data, if a proportion of an unmatched portion between the second estimated measurement result and the map data is larger than a preset threshold.

Other means to solve the problem will be explained in embodiments hereinafter.

Effect of the Invention

In the present invention, whether or not re-creation of a map data is necessary can be notified to an administrator of a robot.

EMBODIMENTS FOR CARRYING OUT THE INVENTION

Next are described in detail modes for carrying out the present invention (to be referred as embodiments hereinafter) with reference to related drawings.

First Embodiment

System Configuration

Figure 1:
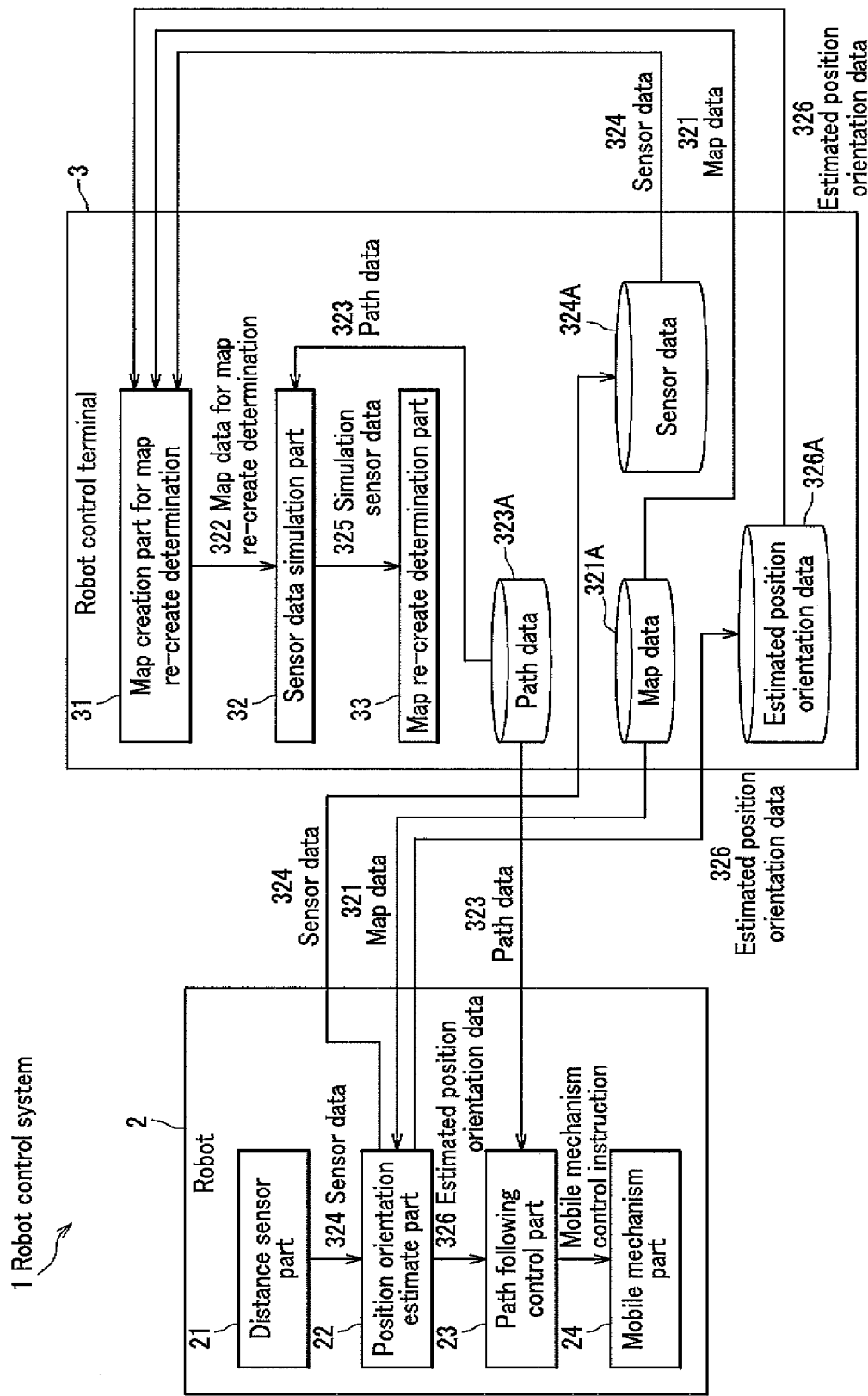
FIG. 1 is a diagram illustrating an example of a configuration of a robot control system according to a first embodiment.

FIG. 1 is a diagram illustrating an example of a configuration of a robot control system according to a first embodiment.

Ax robot control system 1 includes a robot 2 and a robot control terminal 3 which perform radio communication with each other via a wireless LAN (Local Area Network) or the like.

The robot 2 includes a distance sensor part 21, a position orientation estimate part 22, a path following control part 23, and a mobile mechanism part 24.

The distance sensor part 21 measures while shifting directions of laser irradiation, a distance between itself and an object for each of the directions, records the measured distances in association with the respective directions, and generates a sensor data 324 as a laser measured result. The position orientation estimate part 22 estimates a position and an orientation of the robot 2 itself based on the sensor data 324 (which may also be referred to as a measured result) acquired from the distance sensor part 21 and a map data 321 transmitted from the robot control terminal 3, generates an estimated position orientation data 326, and transmits the sensor data 324 and the estimated position orientation data 326 to the robot control terminal 3. The path following control part 23 controls the mobile mechanism part 24 such that the robot 2 itself moves to a destination, based on the estimated position orientation data 326 acquired from the position orientation estimate part 22 and a path data 323 transmitted from the robot control terminal 3, to thereby control a movement of the robot 2 itself. The position orientation data will be described hereinafter with reference to FIG. 4. The mobile mechanism part 24 is a mechanism which moves the robot 2. In this embodiment, it is assumed that the mobile mechanism part 24 is a mobile mechanism which has two drive wheels and one or more casters and rotates by controlling differences of velocities of rotation angles of the drive wheels. However, the mobile mechanism part 24 may be a mobile mechanism for a boat/ship, an aircraft, an airship, a vehicle with a caterpillar track, a robot equipped with a foot, or the like, as long as the mobile mechanism is capable of moving the above-described in an environment.

The robot control terminal 3 includes a map creation part for map re-create determination 31, a sensor data simulation part 32 (which may also be referred to as an estimation part), a map re-create determination part 33 (which may also be referred to as a determination part), a path data storage part 323A, a map data storage part 321A, a sensor data storage part 324A, an estimated position orientation data storage part 326A for the robot 2, and the like.

The path data storage part 323A stores therein a path data 323 which is obtained by being inputted via the keyboard 306 (FIG. 3) of the robot control terminal 3 and previously recording a position and an orientation of the robot 2 when the robot 2 moves in an environment. The sensor data storage part 324A stores therein a data transmitted from the distance sensor part 21 of the robot 2 (the sensor data 324). The map data storage part 321A stores therein the map data 321 which is a preset map data in which a geometric shape of an obstacle in the environment where the robot 2 autonomously moves is recorded. The map data 321 is generated based on the sensor data 324 which is previously collected when the robot 2 moves around in the environment. The estimated position orientation data storage part 326A stores therein the estimated position orientation data 326 which is a data calculated by the position orientation estimate part 22 of the robot 2 and transmitted to the robot control terminal 3.

The map creation part for map re-create determination 31 generates a map data for map re-create determination 322 for generating a temporary map for use in a map re-create determination, based on the sensor data 324, the map data 321, and the estimated position orientation data 326. The sensor data simulation part 32 generates the simulation sensor data 325 which is estimated by simulating the sensor data 324 obtained based on the path data 323 when the robot 2 moves, as a simulated laser measured result. The map re-create determination part 33 determines whether or not it is necessary to re-create a map, based on the map data for map re-create determination 322 and the simulation sensor data 325.

In this embodiment, the robot 2 and the robot control terminal 3 have their respective functions. However, all or part of the functions of the robot control terminal 3 may be implemented on the robot 2.

<Hardware Configuration>

Figure 2:
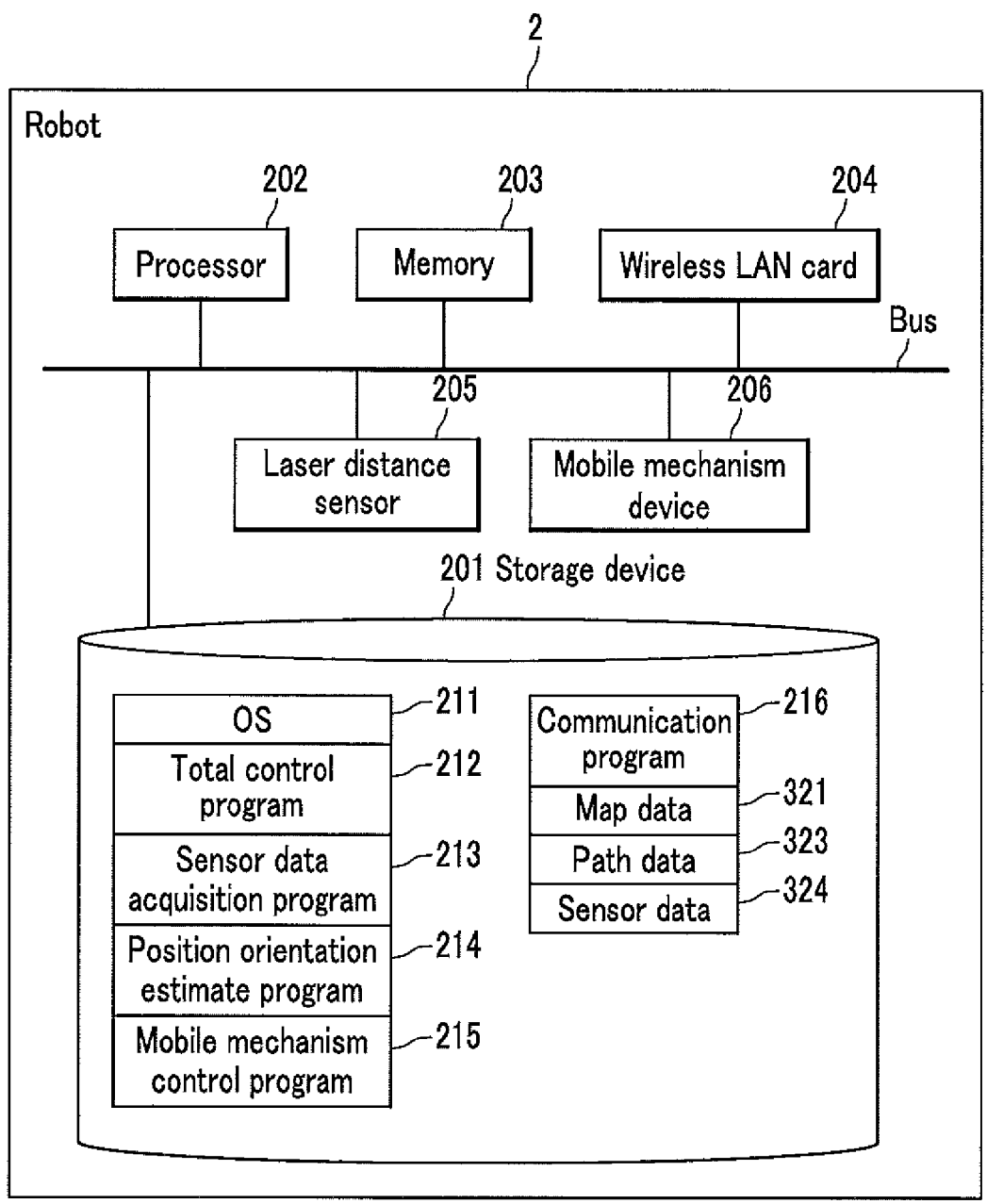
FIG. 2 is a diagram illustrating an example of a hardware configuration of a robot according to the first embodiment.

FIG. 2 is a diagram illustrating an example of a hardware configuration of a robot according to the first embodiment.

The robot 2 includes a processor 202, a memory 203, a wireless LAN card 204, a laser measurement sensor 205 (which may also be referred to as a distance measurement sensor), a mobile mechanism device 206, a storage device 201, and a bus.

The laser measurement sensor 205 irradiates an environment with a laser and detects a reflection of the laser from an obstacle. The sensor data acquisition program 213 generates the sensor data 324 using a data obtained from the laser measurement sensor 205. Note that the laser measurement sensor 205 performs laser scanning in a 180-degree horizontal direction while shifting directions of laser irradiation, and calculates a distance between itself and the obstacle by measuring a time from when a laser beam is irradiated toward an obstacle till when the laser beam reflects off the obstacle and returns to the laser measurement sensor 205. Based on the obtained information on the distances and respective directions thereof, the laser measurement sensor 205 calculates a two dimensional geometric shape of the object present on a scanned plane. In place of the laser measurement sensor 205, any other type of a sensor may be used as long as the sensor can measure a geometric shape of an object. Such sensors include, for example, a laser measurement sensor which measures a geometric shape of an object on a three-dimensional horizontal plane by scanning in a direction besides the horizontal direction; and a stereo camera in which an image feature amount of an object taken by a camera is triangulated by other cameras, to thereby measure a three-dimensional geometric shape of the object. The mobile mechanism device 206 corresponds to the mobile mechanism part 24 in FIG. 1 and description thereof is omitted herefrom.

The storage device 201 is a nonvolatile storage device such as a HD (Hard Disk) and a flash memory and stores therein a program and a data in order for the robot 2 to autonomously move. The program includes, for example, an OS (Operating System) 211, a total control program 212, a sensor data acquisition program 213, a position orientation estimate program 214, a mobile mechanism control program 215, and a communication program 216 which transmits and receives a data to and from the robot control terminal 3. The OS 211 and the total control program 212 are programs for controlling the entire programs.

Each of the sensor data acquisition program 213, the position orientation estimate program 214, and the mobile mechanism control program 215 is expanded in the memory 203 and is executed by the processor 202, to thereby embody the distance sensor part 21, the position orientation estimate part 22, and the path following control part 23 of FIG. 1, respectively. Each of the OS 211, the total control program 212, and the communication program 216 is expanded from the storage device 201 to the memory 203 and is executed by the processor 202, to thereby perform steps shown in FIG. 6.

The storage device 201 also includes a map data 321, a path data 323, a sensor data 324, or the like delivered from the robot control terminal 3.

<Hardware Configuration of Robot Control Terminal>

Figure 3:
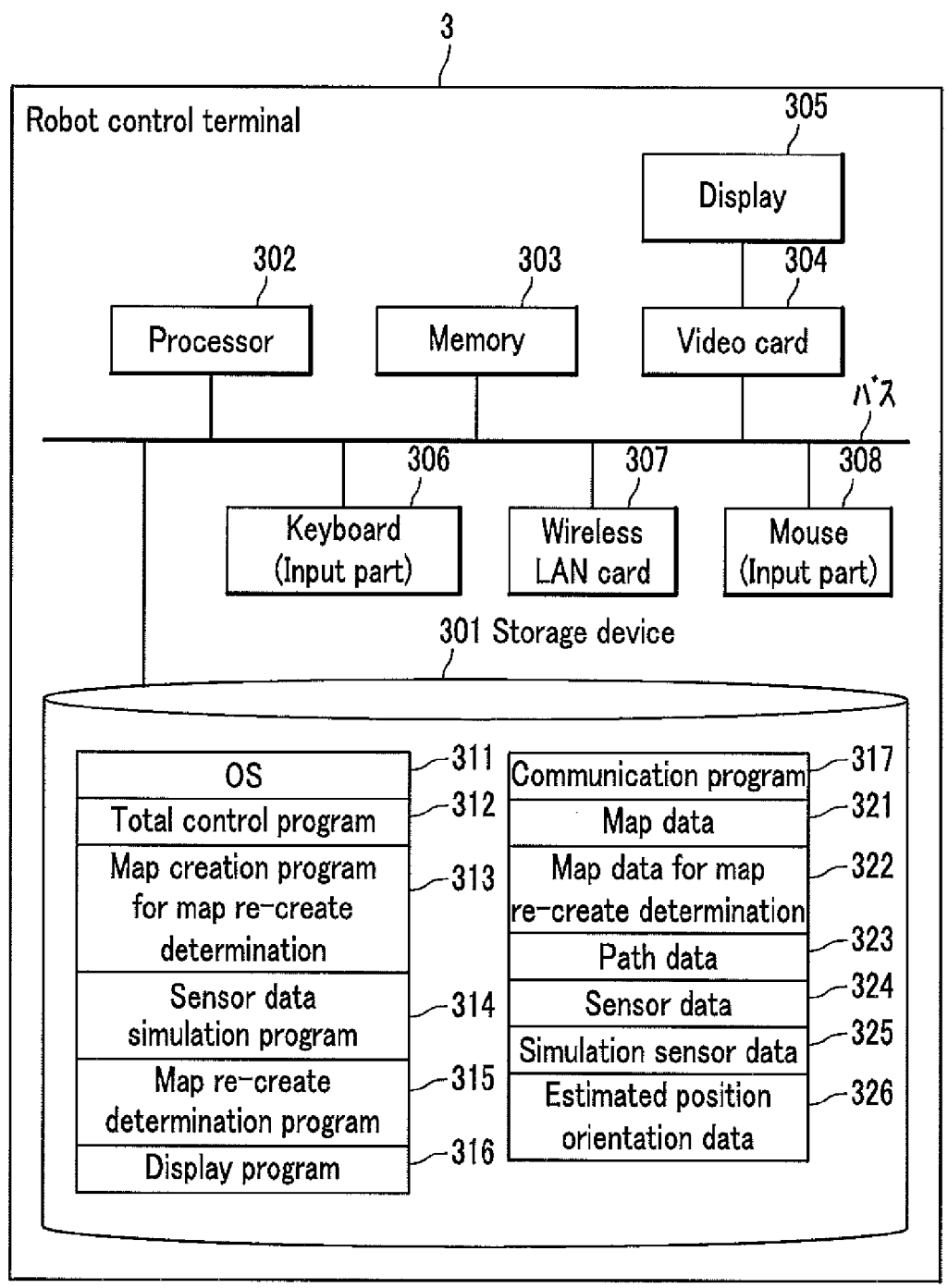
FIG. 3 is a diagram illustrating an example of a hardware configuration of a robot control terminal according to the first embodiment.

FIG. 3 is a diagram illustrating an example of a hardware configuration of a robot control terminal according to the first embodiment.

The robot control terminal 3 includes a processor 302, a memory 303, a video card 304, a display 305 (which may also be referred to as a display part) connected to the video card 304, a keyboard 306 (which may also be referred to as an input part), a wireless LAN card 307, a mouse 308 (which may also be referred to as an input part), a storage device 301 (which may also be referred to as a storage part), and a bus.

The storage device 301 is a nonvolatile storage device such as a HD (Hard Disk) and a flash memory and stores therein a program and a data for determining whether or not a map is to be re-created and displaying a warning where necessary. The program includes, for example, an OS 311, a total control program 312, a map creation program for map re-create determination 313, a sensor data simulation program 314, a map re-create determination program 315, a display program 316, and a communication program 317. The OS 311 and the total control program 312 are programs for controlling the entire programs. Each of the map creation program for map re-create determination 313, the sensor data simulation program 314, and the map re-create determination program 315 is expanded in the memory 303 and is executed by the processor 302, to thereby embody the map creation part for map re-create determination 31, the sensor data simulation part 32, and the map re-create determination part 33 of FIG. 1, respectively. Each of the OS 311, the total control program 312, the display program 316, the communication program 317, and the like is expanded from the storage device 301 to the memory 303 and is executed by the processor 302, to thereby perform steps shown in FIG. 7.

The display program 316 renders information on a location to be re-created or the like via a video card 304 on the display 305 according to the determination of map re-creation. The communication program 317 transmits and receives the sensor data 324 or the like to and from the robot 2.

The storage device 301 also stores therein the map data 321, the map data for map re-create determination 322, the path data 323, the sensor data 324, the simulation sensor data 325, the estimated position orientation data 326 for the robot 2, or the like, as described above with reference to FIG. 1.

Note that, in FIG. 2 and FIG. 3, the map data 321, the path data 323, and the sensor data 324 in the robot 2 are the same as those in the robot control terminal 3, and the same reference numerals are used herein.

In FIG. 2 and FIG. 3, the processors 202, 302 may be embodied by programmable hardware such as FPGA (Field Programmable Grid Array) and CPLD (Complex Programmable Logic Device). The programs and data used herein may be transferred from a storage medium such as a CD-ROM (Compact Disk-Read Only Memory) or may be downloaded from other device via a network. The hardware and software shown in FIG. 2 and FIG. 3 may be selected according to the necessity of a desired embodiment. Communications between the robot 2 and the robot control terminal 3 are herein performed using a wireless LAN. However, any other communication system such as a PHS (Personal Handy Phone) and a wire communication may be used.

It is assumed herein that the robot 2 and the robot control terminal 3 have respective components connected to each other via a wire communication line (the bus). However, the respective components may be connected to each other by wireless as long as communications can be performed. Further, one or more of the components may be physically located remote from the others as long as communications can be performed.

<Position Orientation Data and Types of Grids>

Below are described a position orientation data and types of grids with reference to FIG. 4A and FIG. 4B.

Figure 4A:
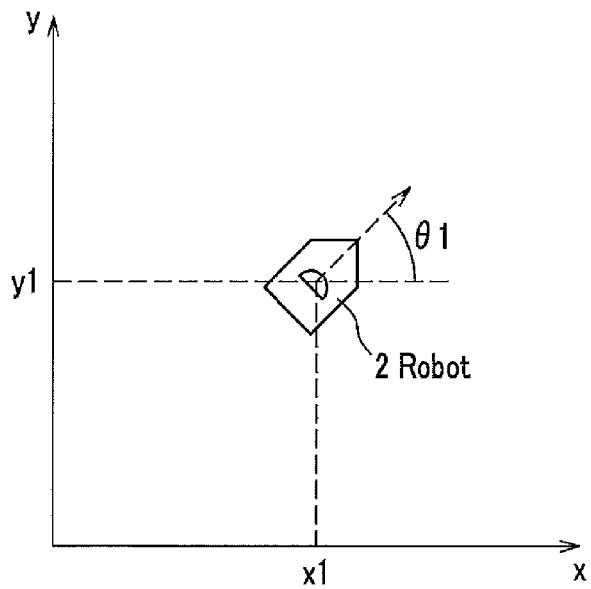
FIG. 4A and FIG. 4B are diagrams for explaining a position orientation data and types of grids, respectively.

FIG. 4A and FIG. 43 are diagrams for explaining a position orientation data and types of grids, respectively.

As shown in FIG. 4A, a coordinate system such as, for example, a world coordinate system is defined in an environment in which the robot 2 moves around. A position of the robot 2 used herein means a coordinate thereof in the coordinate system. In FIG. 4A, the position of the robot 2 is (x1,y1). An orientation of the robot 2 used herein means a direction in which the robot 2 faces. For example, in FIG. 4A, the orientation is represented by an angle ($\theta1$) between the x-axis and the direction of the robot 2.

A position orientation data used herein means a set of data formed by the coordinates of the position and the orientation, that is, (x1,y1,$\theta1$).

Figure 4B:
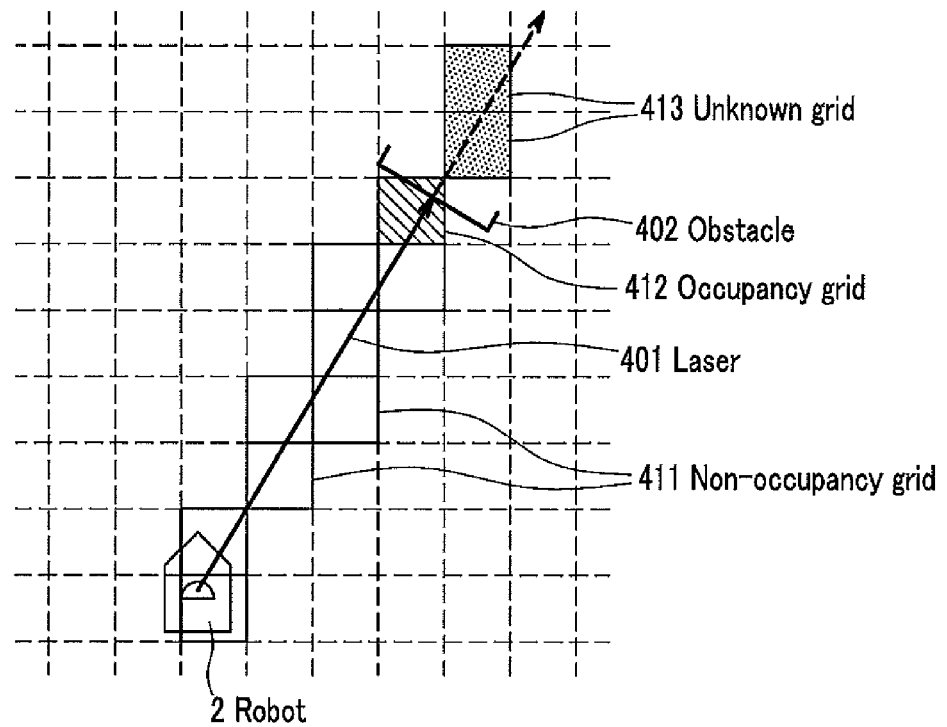

As shown in FIG. 4B, a square-shaped grid with a prescribed dimension is defined in the map data 321 (FIG. 1 to FIG. 3). Let the robot 2 irradiate a laser 401, and let the laser 401 hit an obstacle 402. At this time, a grid containing a point hit by the laser 401 on the obstacle 402 is referred to as an occupancy grid 412. A grid through which the laser 401 travels straight without hitting the obstacle 402 is referred to as a non-occupancy grid 411. And, a grid which is farther than the obstacle 402 is referred to as an unknown grid 413 because the laser 401 will not travel beyond the obstacle 402. Whether the obstacle 402 is in the form of a thin sheet or a thick column, a grid located farther than a surface of the obstacle 402 is the unknown grid 413.

<Example of Processing>

Next is described a robot control method according to this embodiment with reference to FIG. 5 to FIG. 8 as well as FIG. 2 and FIG. 3 where necessary.

Figure 7:
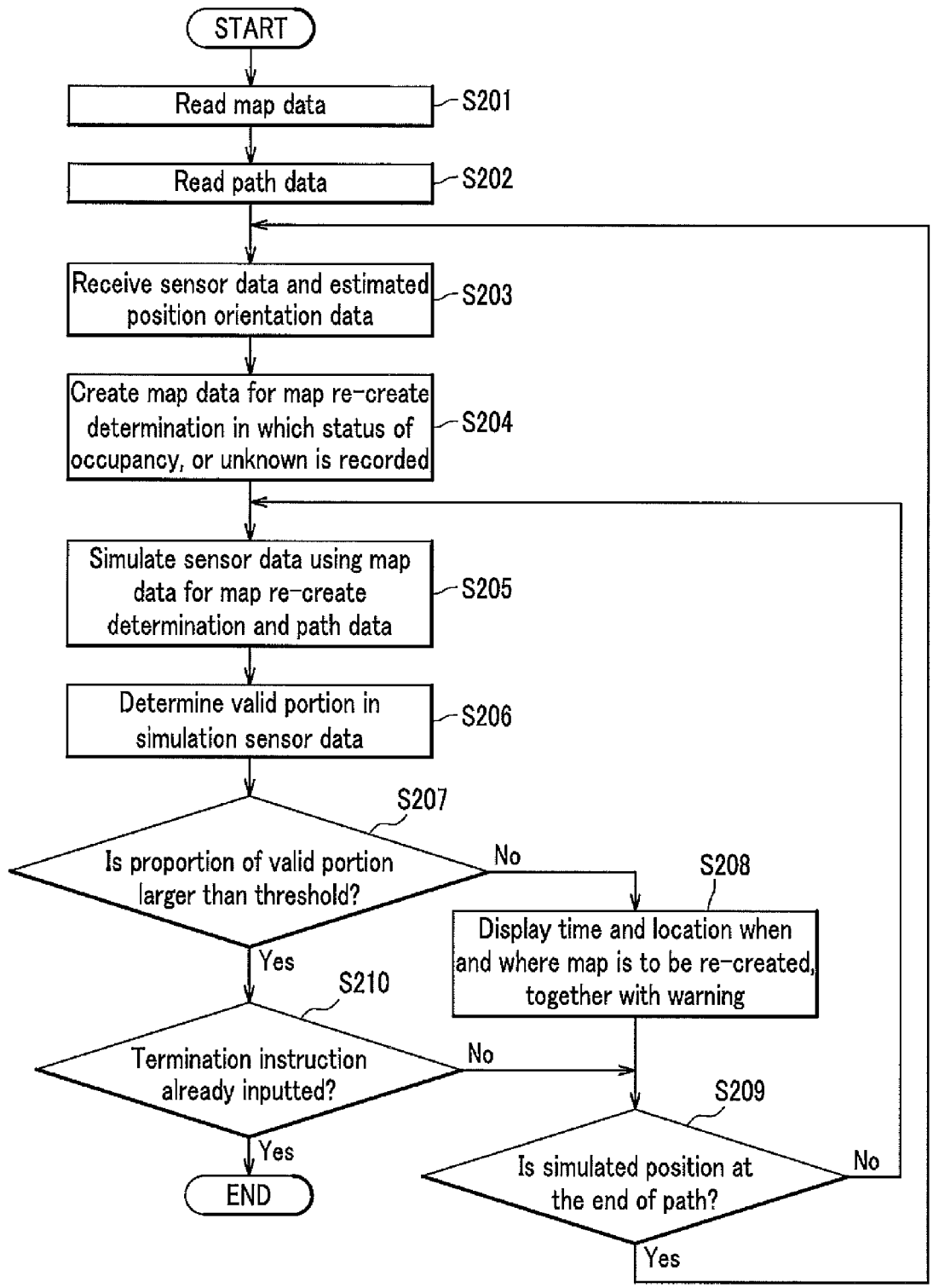
FIG. 7 is a flowchart illustrating steps performed in the robot control terminal according to the first embodiment.

First is described an outline of notification of a re-creation of a map according to this embodiment. Whether or not an unmatched portion generated between an actual environment and the preset map data 321 interferes with a movement of the robot 2 depends on whether or not a position and an orientation of the robot 2 is estimated using the sensor data 324 containing the unmatched portion when the robot 2 moves along a given path. This embodiment focuses on this. If an unmatched portion is generated, the robot control terminal 3 simulates the sensor data 324 acquired from the robot 2 on various paths which the robot 2 can take, measures the unmatched portion, and computes whether or not the position and the orientation can be estimated. If the unmatched portion accounts for a large part of the sensor data 325 acquired after completion of a single simulation, the robot control terminal 3 determines that an error in estimating the position and the orientation occurs and there is a possibility of a failure of an autonomous movement of the robot 2. The robot control terminal 3 thus notifies an administrator of the robot 2 that it is necessary to re-create the map data 321. The terms "the sensor data 325 acquired after completion of a single simulation" used herein mean a sensor data which would be acquired at a place on a path, if the robot 2 took a position and an orientation at the place and the position and the orientation were measured. The terms do not include all of the sensor data which would be acquired by measurement throughout the movement of the robot 2 on the path. That is, referring to FIG. 8 as an example, "the sensor data 325 acquired after completion of a single simulation" corresponds to a sensor data shown by reference numeral 810 in FIG. 8, rather than all of the sensor data which would have been acquired if the robot 2 proceeded on the path 502. In other words, S205 to S210 of FIG. 7 are performed at every place the robot 2 estimates a position and an orientation thereof, if the robot 2 is assumed to move on the path.

As described above, by previously simulating how the robot 2 on the path measures an unmatched portion, it is possible to determine whether or not an unmatched portion affects an autonomous movement of the robot 2 in advance of an actual movement thereof. This allows a re-creation of the map to be performed only if the autonomous movement is determined to be affected, which can reduce the number of re-creations of the map data 321.

Based on an approach to notifying a re-creation of the map data 321 as described above, specific steps are described next. Herein is made description on the robot control system 1 which: determines whether or not there is a discrepancy between the map data 321 and the actual environment and, if any, how the discrepancy affects an estimation of a position and an orientation of the robot 2; and presents, to an administrator, a time and a location when and where a map is to be re-created, using the sensor data 324 representing a geometrical shape of the actual environment measured by the robot 2 of vehicle type which autonomously moves in the actual environment, as well as the path data 323 and the map data 321 previously given to the robot 2.

An example of operating the robot control system 1 including the robot 2 and the robot control terminal 3 as described above is shown below on an assumption that the robot 2 having the laser measurement sensor 205 (FIG. 2) is provided with a path 501 and another path 502 in an environment illustrated as the map data 321 of FIG. 5. Steps performed by the robot 2 and the robot control terminal 3 (FIG. 6 and FIG. 7, respectively) are described assuming a case where a map re-creation is notified if, while the robot 2 is moving along the path 501, someone puts an obstacle 511 which has not been included in the map data 321. The robot 2 is assumed to proceed on the path 501, return to a start point of the path 501, and then proceed on the path 502.

It is also assumed that the map data 321 has been previously created using a program (not shown) for map data creation based on the sensor data 324 collected when the robot 2 moved around in the environment, and has been already stored as the map data 321 of the robot 2 and the map data 321 of the robot control terminal 3. The path data 323 is assumed to record a position orientation data showing a position and an orientation which the robot 2 should take on the map, in association with a time when each position and orientation is to be taken. Reference numerals 521 and 324 will be explained hereinafter.

Figure 6:
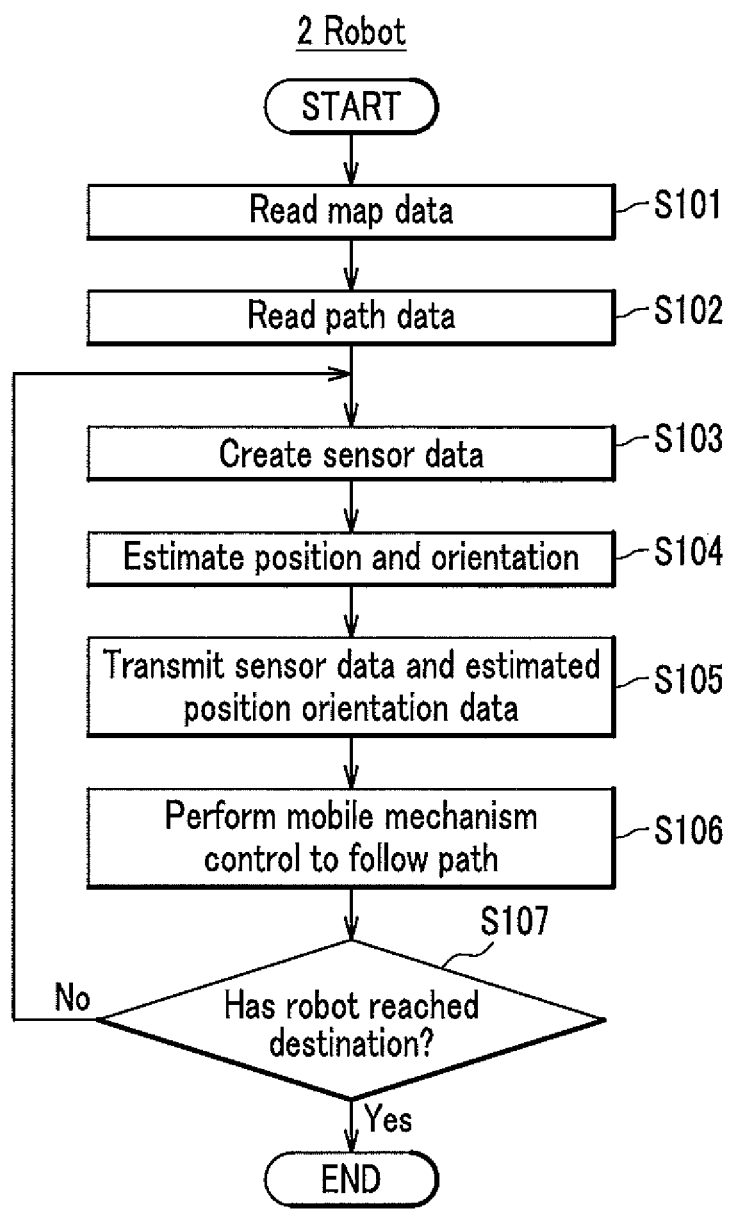
FIG. 6 is a flowchart illustrating steps performed in the robot according to the first embodiment.

FIG. 6 is a flowchart illustrating steps performed in the robot according to the first embodiment.

The total control program 212 of the robot 2 is started. The position orientation estimate program 214 reads the map data 321 transmitted from the robot control terminal 3 (S101).

The mobile mechanism control program 215 reads the path data 323 transmitted from the robot control terminal 3 (S102).

The laser measurement sensor 205 measures the environment. The sensor data acquisition program 213 acquires the measured data and creates the sensor data 324 therefrom (S103).

The position orientation estimate program 214 estimates a position and an orientation of the robot 2 based on a matching of the sensor data 324 and the map data 321 (S104), to thereby create the estimated position orientation data 326. The matching is assumed to be performed using a technique called ICP (Iterative Closest Point). With the technique, the position orientation estimate program 214 makes, from among respective points constituting the sensor data 324 and the map data 321, a pair of points made up of one point from the sensor data 324 and the other from the map data 321 and having the shortest distance therebetween. The position orientation estimate program 214 then estimates relative position and orientation of the robot 2 itself such that a sum of the distances between the corresponded points becomes small, that is, based on the sensor data 324 and the map data 321 when geometric features thereof overlap each other most. Herein, a position and an orientation of the sensor data 324 in the map data 321 estimated using ICP are regarded as a position and an orientation of the robot 2. Note that ICP is used herein as the technique of matching. However, any other technique may be used as long as a similar effect can be achieved.

The communication program 216 transmits the sensor data 324 and the created estimated position orientation data 326 to the robot control terminal 3 via the wireless LAN card 204 (S105). Herein, the communication program 216 may transmit only the sensor data 324 to the robot control terminal 3.

The mobile mechanism control program 215 performs a mobile mechanism control so as to follow a path taken by the robot 2 using the estimated position orientation data 326 and the path data 323 read in S102 (S106).

The mobile mechanism control program 215 controls rotation of a wheel of the robot 2 at the mobile mechanism device 206 such that a difference between a position orientation data which is previously recorded in the path data 323 and which shows a position and an orientation the robot 2 should take, and the estimated position orientation data 326. As a result, the path following can be realized.

The total control program 212 determines whether or not a position of a destination registered in the path data 323 matches a position of the estimated position orientation data 326, to thereby determine whether or not the robot 2 has reached the destination (S107).

After S107, if the robot 2 has not yet reached the destination (S107→No), the robot 2 returns the processing to S103.

After S107, if the robot 2 has reached the destination, (S107→Yes), the robot 2 terminates the processing.

Figure 5:
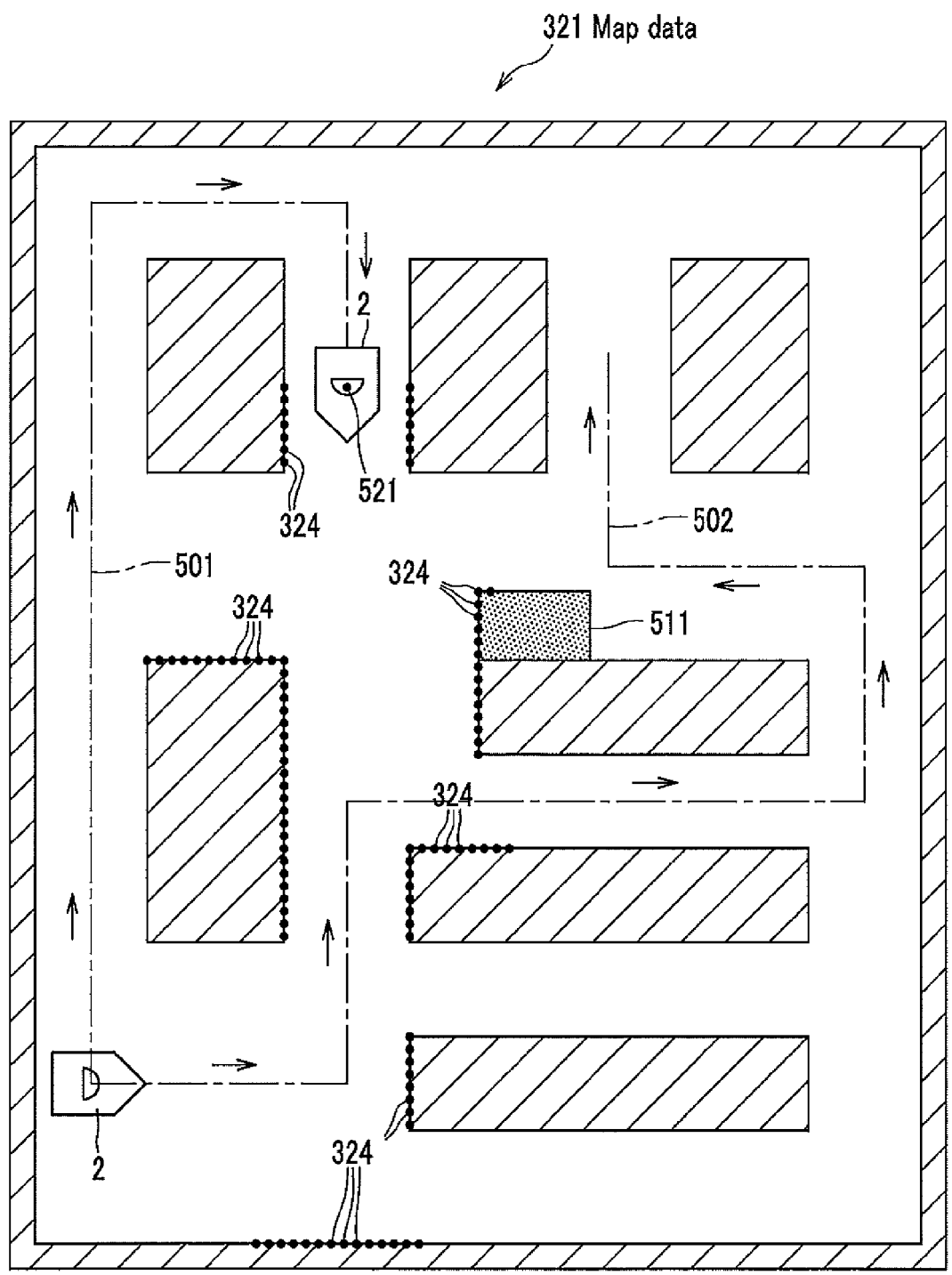
FIG. 5 is a diagram illustrating an example of a map data.

Assume a case in which, while the robot 2 is moving to a point 521 shown in FIG. 5 under such a path following control, an obstacle 511 is placed in the actual environment, which has not been present in the map data 321, the robot 2 which has reached the point 521 acquires the sensor data 324. The position orientation estimate program 214 estimates the position and the orientation as described in S104 based on the sensor data 324. The estimated position orientation data 326 obtained by the estimation and the sensor data 324 are transmitted to the robot control terminal 3 in S105. A flow of steps in the robot control terminal 3 which receives the data 326, 324 is described below with reference to FIG. 7.

FIG. 7 is a flowchart illustrating steps performed in the robot control terminal according to the first embodiment.

Upon a start of the total control program 312, the map creation program for map re-create determination 313 reads the map data 321 in the storage device 301 (S201).

The sensor data simulation program 314 reads the path data 323 in the storage device 301 (S202).

The communication program 317 receives the sensor data 324 and the estimated position orientation data 326 transmitted from the robot 2 in S105 of FIG. 6 via the wireless LAN card 307 (S203). The received sensor data 324 and the estimated position orientation data 326 are temporarily stored in the storage device 301.

The map creation program for map re-create determination 313 creates the map data for map re-create determination 322 in which a status of occupancy, non-occupancy, or unknown is recorded for each grid (S204). The map data for map re-create determination 322 is created by integrating a map data replicated from the map data 321, into the sensor data 324 subjected to coordinate transformation to a coordinate system of the map data 321 according to the estimated position orientation data 326.

When the sensor data 324 is integrated into the map data for map re-create determination 322, a new status is assigned to the each grid due to a new sensor-obstacle relationship with respect to a position and an orientation. The assigned status includes occupancy, non-occupancy, and unknown as described with reference to FIG. 43.

Figure 8:
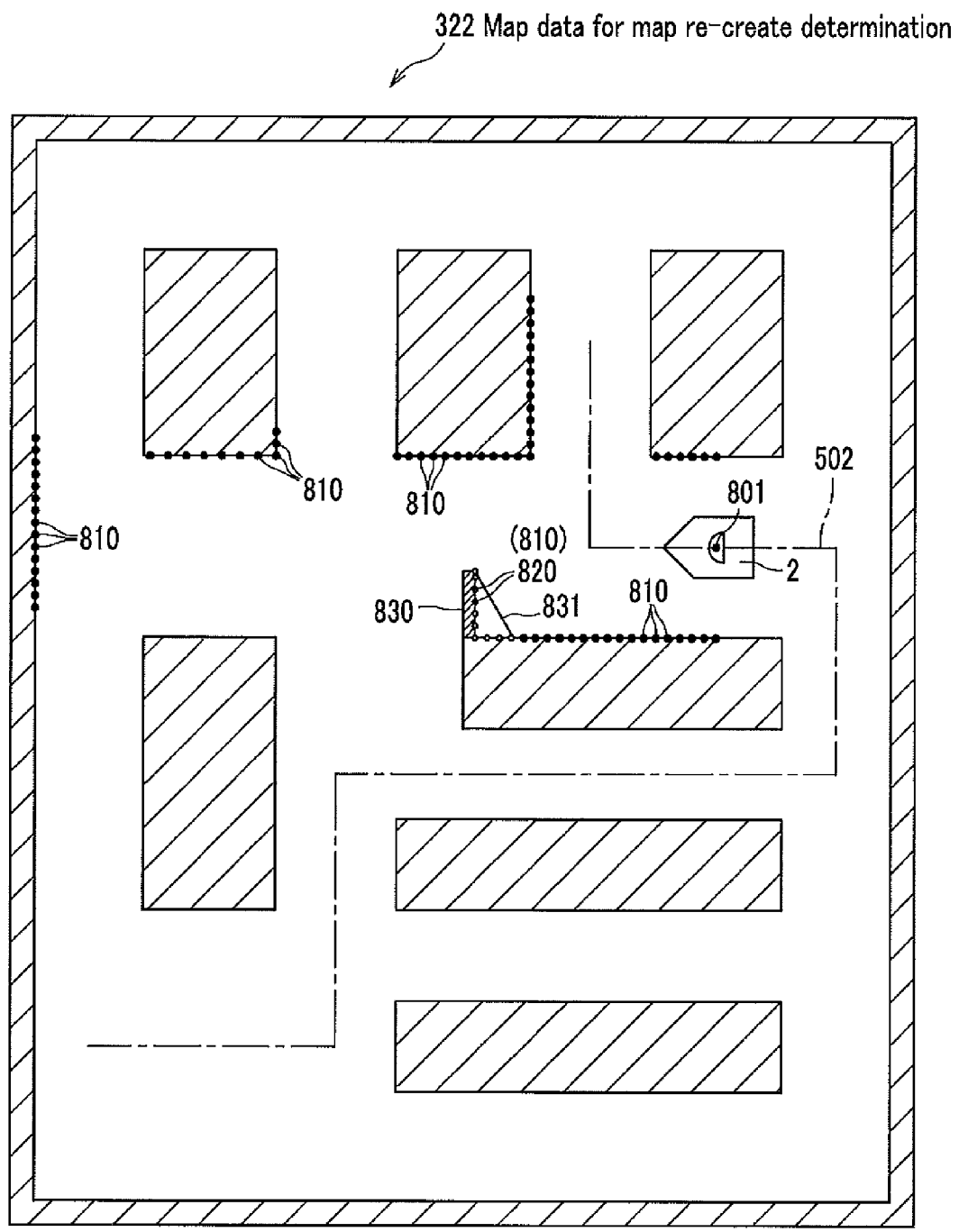
FIG. 8 is a diagram illustrating an example of a map data for map re-create determination.

The map creation program for map re-create determination 313 creates the map data for map re-create determination 322 shown in FIG. 8 as a result of the integration of the sensor data 324 and the map data 321 obtained at the point 521 of FIG. 5. In FIG. 8, an area 830 corresponding to a grid in an occupancy status at which existence of an obstacle is newly determined, and an area 831 corresponding to a grid in an unknown status at which whether or not there is an obstacle is not yet known are added to the map data for map re-create determination 322. Herein, an obstacle which has always been existent in the map data 321 is assumed not to be moved from its original position.

The FIG. 8 areas 830, 831 are portions unmatched with the FIG. 5 map data 321. Whether or not the unmatched portions result in an error in estimating a position and an orientation of the robot 2 depends on a path taken by the robot 2 and a sensor data estimated when the robot 2 moves along the path (the simulation sensor data 325). Reference numerals 801, 810, 820 will be described hereinafter.

The sensor data simulation program 314 simulates the sensor data 324 obtained when the robot 2 moves in an environment represented by the map data for map re-create determination 322 in accordance with the path data 323 (S205). Herein, the sensor data simulation program 314 performs a simulation of calculating a coordinate of a point at which a laser used for scanning by the robot 2 intersects an obstacle (the simulation sensor data 325), when the robot 2 takes a position and an orientation that the robot 2 itself should take in accordance with the path data 323. In the simulation, the sensor data simulation part 32 regards that the laser transmits through an unknown grid, and acquires the sensor data 324 concerning a point at which a course of the laser intersects an occupancy grid. For example, in FIG. 8, the simulation sensor data 325 obtained when the robot 2 moves along the path 502 and takes a position and an orientation represented by reference numeral 801 is as shown by reference numeral 810. The simulation sensor data 325 is stored in the storage device 301 of the robot control terminal 3.

The map re-create determination program 315 then determines a valid portion in the simulation sensor data 325 (S206). The map re-create determination program 315 determines the valid portion in such a manner that, if, for each of a coordinate of a group of points constituting the simulation sensor data 325 (reference numeral 810 in FIG. 8), a line connecting the coordinate to a position of a sensor at the robot 2 does not pass through an unknown grid, a corresponding portion is valid, and, in any other case, invalid. In the example of FIG. 8, the map re-create determination part 33 determines that, from among the sensor data 810 obtained by the simulation, a portion of the simulation sensor data with reference numeral 820 (a white circle) is an invalid portion, and the other portion is a valid portion.

The map re-create determination program 315 determines whether or not a proportion of a valid portion in the simulation sensor data 325 after completion of a single simulation is larger than a preset threshold (S207). The threshold is set as follows. When the map data 321 is created, the map re-create determination program 315 confirms that the robot 2 can make a normal autonomous movement in the environment according to the path data 323, and then calculates and stores the sensor data 324 and the estimated position orientation data 326 obtained in series upon the autonomous movement. Next, the map re-create determination program 315 converts the simulation sensor data 325 to a coordinate system of the map data 321 based on the estimated position orientation data 326 and calculates a proportion in which an occupancy grid in the map data 321 overlaps with the simulation sensor data 325. The map re-create determination program 315 calculates the proportion for each data of the sensor data 324 obtained during the autonomous movement, calculates an average of the proportions, and multiplies the average by a coefficient indicating a proportion in which a discrepancy is allowable, to thereby obtain a threshold for determining a valid portion. In this embodiment, the threshold is set as described above. However, any other technique is available as long as the technique can be used in determining whether or not it is necessary to re-create the map.

As a result of S207, if the proportion of a valid portion to the entire simulation sensor data 325 is equal to or less than a preset threshold (S207→No), this means that an invalid portion, that is, an unknown portion is larger, and the map re-create determination program 315 estimates a possible occurrence of a matching error between the map data 321 and the sensor data 324 in the robot 2. The display program 316 displays a time and a location when and where the map (the map data 321) is to be re-created, together with a warning on the display 305 (S208). The total control program 312 determines whether or not a simulated position (reference numeral 801 in FIG. 8) is at the end of the path (S209). The time used herein means, for example, whether or not the map data 321 should be re-created immediately. The time to be displayed is herein, for example, preset in the storage device 301. Alternatively, the time may not be displayed. The warning is displayed in such a manner that the display program 316 superimpose-displays, in the actual map data 321 and path data 323, an unknown grid calculated in S204, the simulation sensor data 325 containing a portion determined as invalid in S206, and a portion of a path at which an invalid data as the sensor data 324 is likely to be acquired, in a warning color such as red. For example, on a warning screen 900 of FIG. 9, the display program 316 highlights a portion 901 and a simulated position 902.

As a result of S209, if the simulated position is not at the end of the path (S209→No), the total control program 312 brings forward the simulated position to the next one and returns the processing to S205. The terms "bring forward the simulated position to the next one" used herein means bringing forward the simulated position to a position at which a position and orientation measurement on the path is to be performed after an elapse of a preset measurement time.

As a result of S209, if the simulated position is at the end of the path (S209→Yes), the total control program 312 returns the processing to S203 and receives the sensor data 324 and the estimated position orientation data 326 at the next position of the robot 2 in the environment.

As a result of S207, if the proportion of a valid portion to the entire simulation sensor data 324 is larger than the preset threshold (S207→Yes), the total control program 312 determines whether or not a termination instruction indicating termination of an operation of the robot 2 has already been inputted from the keyboard 306 (S210).

As a result of S210, if the termination instruction has not yet been inputted (S210→No), the total control program 312 advances the processing to S209.

As a result of S210, the termination instruction has already been inputted (S210→Yes), the total control program 312 terminates the processing.

In this embodiment, the robot control terminal 3 runs a simulation on a path on which the robot 2 as a processing target moves (S205 to S210). However, S205 to S210 may be performed on an other path. Such a path targeted as the simulation may include a path on which an other robot 2 travels, a path on which the robot 2 does not travel at present but is likely to travel some time in the future, and the like.

The configuration as described above makes it possible to determine whether or not re-creation of the map data 321 is necessary regarding a path on which an other robot 2 travels, a path on which the robot 2 is likely to travel in the future, and the like.

The robot control terminal 3 determines, in the simulation sensor data 325, a differential portion between the map data for map re-create determination 322 and the map data 321, as an invalid portion, and the other portion, as a valid portion. The robot control terminal 3 then determines whether or not a proportion of the valid portion to the simulation sensor data 325 is larger than a preset threshold, to thereby determine whether or not a proportion of the unmatched portion between the simulation sensor data 325 and the map data 321 is larger than a preset threshold.

In this embodiment, the sensor data 324 is used in calculating a proportion of a valid portion. However, a grid may be used instead. That is, in S207, the map re-create determination program 315 may determine whether or not a proportion of an unknown grid to an occupancy grid after completion of a single simulation is larger than a preset threshold. In other words, whether or not a proportion of a grid corresponding to a difference between the map data 321 and the map data for map re-create determination 322 is first determined. Then, whether or not a proportion of an unmatched portion between the simulation sensor data 325 and the map data 321 is larger than a preset threshold can be determined.

According to the first embodiment, it is possible to detect an unmatched portion between the actual environment and the map data 321 which may incur an error of estimating a position and an orientation of the robot 2 when the robot 2 autonomously moves. It is also possible to notify an administrator of the robot control system 1 that a preset time for re-creating a map has come and that which portion on the map is to be re-created.

In this embodiment, the robot 2 is assumed to move autonomously. However, the robot 2 may move by remote control by an operator. In this embodiment, the map data 321 is assumed to be a two-dimensional data. However, the map data 321 may be a three-dimensional data.

In this embodiment, in S105, the robot 2 transmits the sensor data 324 and the estimated position orientation data 326 to the robot control terminal 3. However, the robot 2 may transmit only the sensor data 324 to the robot control terminal 3. In this case, a matching between the sensor data 324 and the map data 321 is performed in the robot control terminal 3, and the estimated position orientation data 326 is calculated.

In this embodiment, S203 to S209 are performed regardless of detection of a portion unmatched with the map data 321. However, S203 to S209 may be performed only when the robot control terminal 3 detects a portion unmatched with the map data 321.

Second Embodiment

In this embodiment, the robot 2 may also be equipped with the functions of the robot control terminal 3.

In the first embodiment, how to obtain a threshold is described in which the robot 2 is previously moved, from which a matching result between the sensor data 324 and the map data 321 is obtained, to thereby determine the threshold. In the second embodiment, how to manually set a threshold using GUI (Graphical User Interface) in the robot control terminal 3 is explained.

Figure 10:
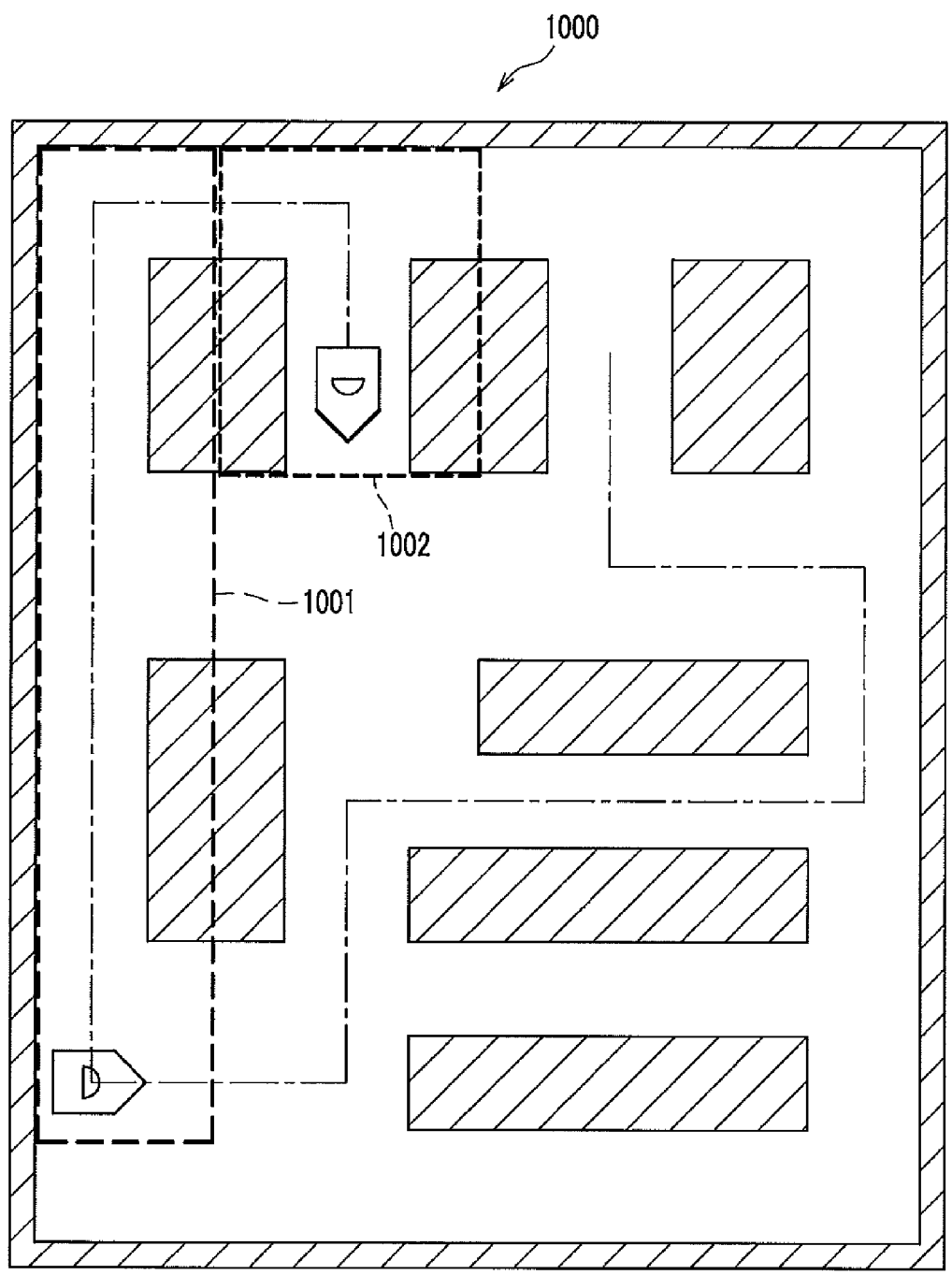
FIG. 10 is a diagram illustrating a GUI screen for setting a threshold according to a second embodiment.

FIG. 10 is a diagram illustrating an example of a GUI screen for setting a threshold according to the second embodiment.

On a GUI screen 1000, the map data 321 (FIG. 1 to FIG. 3) and the path data 323 (FIG. 1 to FIG. 3) are displayed. An administrator of the robot 2 specifies rectangular areas 1001, 1002, or the like using the mouse 308 (FIG. 3) and sets a threshold for each of the specified rectangular areas 1001, 1002. For example, a threshold in the rectangular area 1002 is set higher than a threshold in the rectangular area 1001 if the robot 2 stops in the rectangular area 1002 upon an unloading operation, and thus, an obstacle has to be detected with higher precision in the rectangular area 1002. Other area which has a higher threshold may include a location with a lot of people passing by, a yard for carts, and the like. A shape of the specified area is not limited to a rectangle and any other shape such as a circle may be used.

According to the second embodiment, a threshold can be set with flexibility depending on a state of the environment.

In the example shown in FIG. 10, assignment of a threshold for re-creating a map is explained. However, another example is possible in which an error allowable in estimating a position and an orientation can be set with drawing as shown in FIG. 10 using the mouse 308 (FIG. 3).

For example, in S104 of FIG. 6, a position and an orientation are estimated based on a matching by ICP between the sensor data 324 and the map data 321. At this time, an average of a sum of distances therebetween, that is, distances each between a point hit by laser on an object and the map data 321 may be taken as a threshold. The robot control terminal 3 may set the threshold obtained by calculating the average of the distances between the points of the sensor data 324 and the map data 321 for each area as shown in FIG. 10. In this case, if the average of the distances between the points of the simulation sensor data 325 and the map data 321 is larger than a preset threshold, a configuration is possible in which the robot control terminal 3 determines that an estimation error of a position and an orientation is likely to occur and notifies an administrator of the robot 2 that re-creation of the map data 321 is necessary.

Herein, the mouse 308 is used as a pointing device. However, any other device such as a joystick, the keyboard 306, and a touch panel can be used as long as the device has a similar function thereto. An area to which a threshold is specified is herein assumed to be a rectangular area as an example. However, how to define the area is not limited and a free curve or any other technique capable of defining the area can be used. Further, the description above is made in the two-dimensional space. However, it is easily understood that this embodiment can be carried out in the three-dimensional space.

Third Embodiment

In the first embodiment, if an unmatched portion is detected, the detected result is notified to an administrator of the robot 2 using a warning display on the display part of the robot control terminal 3. In this embodiment, description is made in an example in which the detected result is notified to an operator (s) at site using a display device owned by the robot 2.

Figure 11:
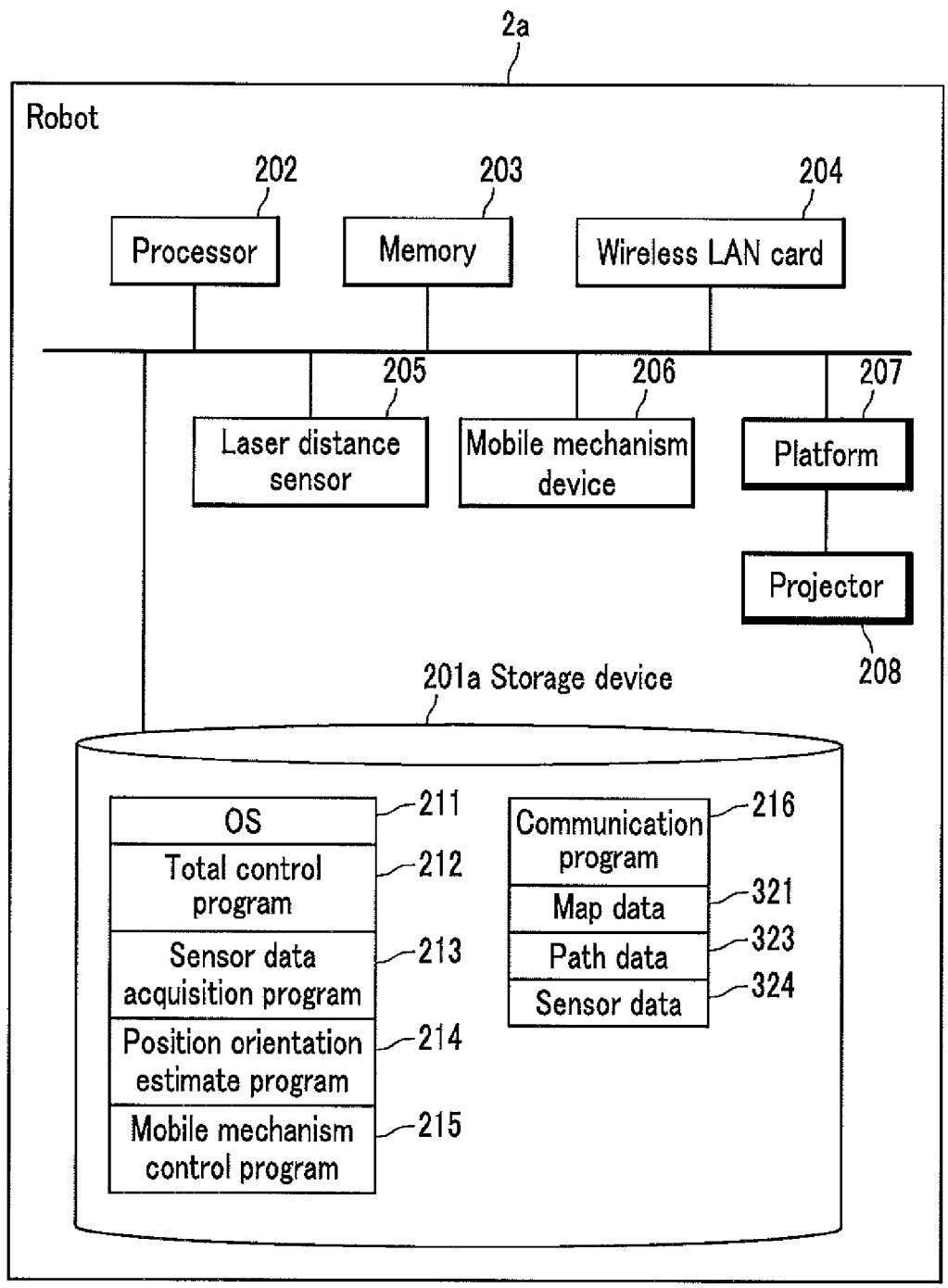
FIG. 11 is a diagram illustrating an example of a hardware configuration of a robot according to a third embodiment.

FIG. 11 is a diagram illustrating an example of a hardware configuration of a robot according to a third embodiment.

Figure 9:
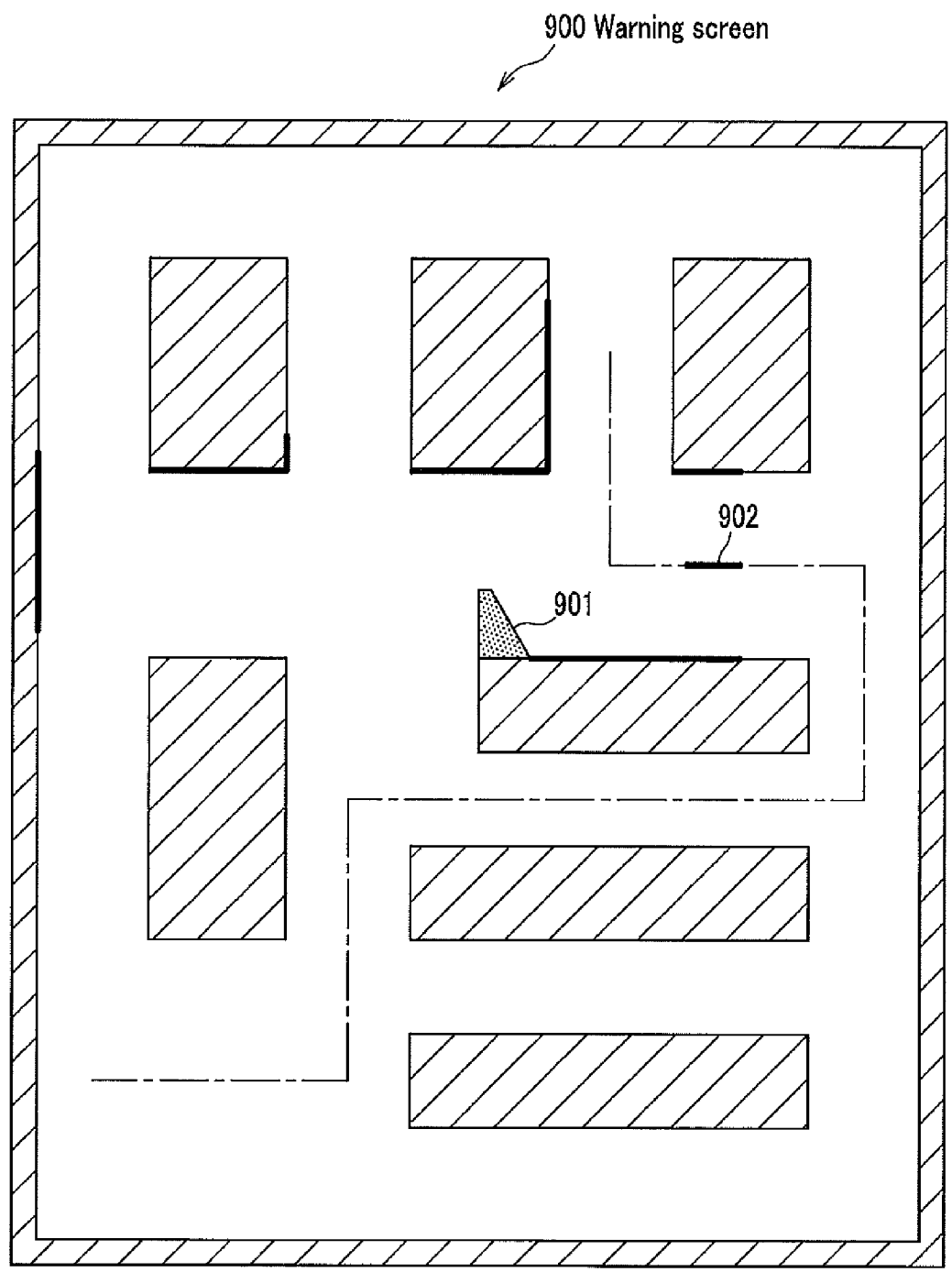
FIG. 9 is a diagram illustrating an example of a warning screen.

A configuration of a robot 2a shown in FIG. 11 is the same as the configuration shown in FIG. 2 except that the configuration of FIG. 11 additionally has a platform 207 and a projector 208 (which may also be referred to as an instruction display part) that presents an unmatched portion to an operator at site or the like. The projector 208 is mounted on the platform 207 that can change an orientation or a height of the projector 208. In the first embodiment, in S104 of FIG. 6, the robot 2 estimates a position and an orientation thereof. The estimated result is transmitted to the robot control terminal 3. In S204 of FIG. 7, the robot control terminal 3 thereby creates the map data for map re-create determination 322 as shown in FIG. 8. In the third embodiment, the robot 2a: receives the map data for map re-create determination 322 as shown in FIG. 9 and a data on the warning screen 900 from the robot control terminal 3; and adjusts the platform 207 based on the received data such that the projector 208 turns to an unmatched portion in an actual environment. The projector 208 projects a warning color such as red onto an unmatched portion of the actual environment, to thereby notify relevant people (for example, an operator at site) that the unmatched portion is generated. In this example, the projector 208 is assumed to be used. However, a light or a laser may be used instead. Further, generation of an unmatched portion between the map data 321 and an actual environment may be detected from a behavior of the robot 2a. For example, if an unmatched portion is generated at a place in an environment, the robot 2a performs a pivot turn (pivots on the spot without proceeding backward or forward) around the place.

If the robot 2a is equipped with the configuration of the robot control terminal 3 shown in FIG. 3, the robot 2a performs S204 to S209. With this configuration, in the robot 2a, it is possible to: create the map data for map re-create determination 322 and a data of the warning screen 900; adjust the platform 207 such that the projector 208 turns to an unmatched portion in the actual environment; and project a warning color such as red onto an unmatched portion of the actual environment, to thereby notify relevant people that the unmatched portion is generated.

According to the third embodiment, a portion unmatched with the map data 321 can be presented not only to an administrator but also to an operator at site or the like.

The robot 2 according to this embodiment is suitably used as a carrier robot in a factory. However, the robot 2 is also applicable to a patrol robot such as a monitoring robot.

Re-creation of the map data 321 may be performed in such a manner that the robot 2, while moving along a path, temporarily stops the movement and moves around an obstacle, or that another robot 2 which is different from the robot 2 moving along the path, moves around in the environment.

It is also assumed in this embodiment that the robot 2 performs S203 to S209 every time the robot 2 moves. However, the robot 2 may perform S203 to S209 every several times the robot 2 moves or every several seconds.

DESCRIPTION OF REFERENCE NUMERALS 1 robot control system
2 robot
3 robot control terminal
21 distance sensor part
22 mobile mechanism part
23 path following control part
24 mobile mechanism part
31 map creation part for map re-create determination
32 sensor data simulation part (estimation part)
33 map re-create determination part (determination part)
201 storage device (for robot)
205 laser measurement sensor (distance measurement sensor)
206 mobile mechanism device
208 projector (instruction display part)
212 total control program (for robot)
213 sensor data acquisition program mechanism control program
216 communication program (for robot)
301 storage device (for robot control terminal: storage part)
312 total control program (for robot control terminal)
313 map creation program for map re-create determination
314 sensor data simulation program
315 map re-create determination program
317 communication program
321 map data
322 map data for map re-create determination
323 path data
324 sensor data (measured result)
325 simulation sensor data (estimated measured result)
326 estimated position orientation data

The invention claimed is:
1. A robot control system, comprising;
a robot equipped with a distance measurement sensor to detect a three-dimensional distance to each of points of obstacles, and configured to move on a path while detecting the points of the obstacles with the distance measurement sensor; and
a robot control terminal that stores a map data in a storage part and instructs the robot on which path the robot is to move,
wherein the robot transmits a first measurement result obtained at a first location on a path by the distance measurement sensor, to the robot control terminal, and
wherein the robot control terminal
simulates a simulated measurement result for a second location on the path at which the robot is to arrive after the robot moves, based on the map data and the first measurement result transmitted from the robot,
determines a necessity of a re-creation of the map data if a proportion of a valid portion of the simulated measurement result is less than a preset threshold, and notifies a user of the necessity of re-creation of the map data.

2. The robot control system according to claim 1,
wherein the robot control terminal
creates the map data based on the first measurement result transmitted from the robot, and
compares the simulated measurement result with the map data to discriminate the valid portion and an invalid portion of the simulated measurement result.

3. The robot control system according to claim 1,
wherein the robot control terminal displays an invalid portion of the simulated measurement result in the display part.

4. The robot control system according to claim 1,
wherein the robot control terminal divides the map data into prescribed sections and sets a threshold for each of the sections.

5. The robot control system according to claim 1, wherein the map data includes a set of grids, and
wherein if the distance measurement sensor detects a new sensor obstacle, the set of grids includes one or more occupancy grids and one or more unknown grids.

6. The robot control system according to claim 5, wherein an invalid portion includes any point of an obstacle wherein a straight line between the point of the obstacle and the second location passes through an unknown grid.

7. A robot control terminal which stores a map data in a storage part and instructs a robot on which path the robot is to move, comprising:
a storage part that store map data indicating a geometric shape of obstacles in an environment where the robot moves around and map data indicating at least a path along which the robot is to move,
a sensor data acquisition part that accepts and holds a first measurement result of a distance measurement sensor carried on the robot which is located at a first location on a path,
an estimation sensor data simulation part that simulates, based on the map data and the first measurement result, a simulated measurement result for a future time at a location at which the robot is to arrive after the robot moves;
and a determination part that determines a necessity of re-creation of the map data if a proportion of a valid portion of the simulated measurement result is less than a preset threshold, and notifies a user of the necessity of re-creation of the map data.

8. The robot control terminal according to claim 7, further comprising a map creation part that creates the map data based on the first measurement result transmitted from the robot,
wherein the determination part compares the simulated measurement result with the map data to discriminate the valid portion and an invalid portion of the simulated measurement result.

9. The robot control terminal according to claim 7, wherein the map data includes a set of grids, and
wherein if the distance measurement sensor detects a new sensor obstacle, the set of grids includes one or more occupancy grids and one or more unknown grids.

10. The robot control terminal according to claim 9, wherein an invalid portion includes any point of an obstacle wherein a straight line between the point of the obstacle and the second location passes through an unknown grid.

\* \* \* \* \*